United States Patent
Lawande (10) Patent No.: US 7,840,553 B2
(45) Date of Patent: Nov. 23, 2010

(54) RECOMMENDING MATERIALIZED VIEWS FOR QUERIES WITH MULTIPLE INSTANCES OF SAME TABLE

(75) Inventor: Shilpa S. Lawande, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 693 days.

(21) Appl. No.: 11/366,068

(22) Filed: Mar. 2, 2006

(65) Prior Publication Data

US 2007/0083489 A1 Apr. 12, 2007

(51) Int. Cl.
*G06F 7/00* (2006.01)
(52) U.S. Cl. .................................... 707/714
(58) Field of Classification Search ............ 707/3, 707/714
See application file for complete search history.

(56) References Cited

U.S. PATENT DOCUMENTS

| | | | |
|---|---|---|---|
| 5,960,423 | A | 9/1999 | Chaudhuri et al. |
| 6,275,818 | B1 * | 8/2001 | Subramanian et al. ......... 707/2 |
| 6,347,314 | B1 | 2/2002 | Chidlovskii |
| 6,356,889 | B1 | 3/2002 | Lohman et al. |
| 6,513,029 | B1 | 1/2003 | Agrawal et al. |
| 6,721,747 | B2 * | 4/2004 | Lipkin ............................... 1/1 |
| 2002/0073236 | A1 * | 6/2002 | Helgeson et al. ............ 709/246 |
| 2003/0093408 | A1 * | 5/2003 | Brown et al. ..................... 707/2 |
| 2003/0182282 | A1 * | 9/2003 | Ripley ........................... 707/5 |
| 2004/0122804 | A1 | 6/2004 | Zhang et al. |
| 2005/0125427 | A1 | 6/2005 | Dageville et al. |
| 2005/0256835 | A1 | 11/2005 | Jenkins et al. |

OTHER PUBLICATIONS

Kimberly Floss, Getting Good Advice About Access, (As Published in Oracle Magazine), Jul. Aug. 2004, pp. 1-4, Oracle Technology Network, Oracle Corp., Redwood Shores, CA.
Dr. Lilian Hobbs, Oracle Materialized Views & Query Rewrite, (An Oracle White Paper), May 2005, pp. 1-24, Oracle Corp., Redwood Shores, CA.
Ramakrishnan et al., "Database Management Systems", Third Edition, McGraw-Hill, 2003.
Chaudhuri, "An Overview of Query Optimization in Relational Systems" Proceedings of the Seventeenth ACM SIGACT-SIGMOD-SIGART Symposium on . . . , p. 34-42; Seattle, WA; 1998; ACM.
U.S. Office Action dated May 9, 2007 for U.S. Appl. No. 11/287,622, filed Nov. 28, 2005. (pp. 1-14).
USPTO Non-Final Office Action in co-pending U.S. Appl. No. 11/287,622, filed Nov. 28, 2005, having a mailing date of Jul. 29, 2008.

(Continued)

*Primary Examiner*—Charles Rones
*Assistant Examiner*—Fazlul Quader
(74) *Attorney, Agent, or Firm*—Kraguljac & Kalnay, LLC (57) ABSTRACT

Systems, methods, computer-readable media and other embodiments are provided that relate to processing database queries. In one embodiment, a query analysis logic can be configured to analyze a query to identify multiple instances of the same table. Instance numbering for the multiple table instances can then be performed using the query structure such that equivalent queries will likely get the same instance number assignments to improve materialized view recommendations for queries.

11 Claims, 4 Drawing Sheets

OTHER PUBLICATIONS

Chong, et. al., "An Efficient SQL-based RDF Querying Scheme", Proceedings of the 31st International Conference on Very Large Databases 2005, pp. 1216-1227, Aug. 30-Sep. 2, 2005 ACM.

U.S. Office Action in co-pending U.S. Appl. No. 11/287,622, and entitled "Functional-Based Index Tuning for Queries With Expressions" having a date of mailing of Feb. 4, 2009.

DBASupport.com: http/www.DBAsupport.com/http://www.dbasupport.com/oracle/ora8/fbi.shtml-, Accessed Sep. 26, 2007, Jupitermedia Co. 2007 (pp. 1-8).

US Patent Office: Office Action from U.S. Appl. No. 11/287,622; dated Oct. 1, 2007; pp. 1-15 & cv:).

* cited by examiner

RECOMMENDING MATERIALIZED VIEWS FOR QUERIES WITH MULTIPLE INSTANCES OF SAME TABLE

BACKGROUND

A materialized view (MV) is an access structure used for performance tuning of SQL queries. A materialized view can be thought of as a special kind of view, which physically exists inside a database. The MV can contain joins and/or aggregates and exists to improve query execution time by pre-calculating expensive joins and aggregation operations prior to execution. A Materialized view is also known as a summary or an aggregate table.

Materialized views eliminate the overhead associated with gathering and deriving the data every time a query is executed. Through a process known as query rewrite, a query can be optimized to recognize and use existing materialized views that could answer the query. Typically, the query rewrite optimization is transparent to an application that submits the query. That is, the rewrite operation happens automatically and does not require the application to know about the existence of materialized views, nor that a particular materialized view has been substituted for the original query.

During query rewrite, the query is analyzed against a specific materialized view, in order to assign instance numbers to duplicate table instances. This is done by comparing the join graphs of the MV and query. Once the instance numbers are assigned, then the remainder of query rewrite algorithms will treat two tables with different instance numbers as if they were different tables.

However, during an initial input of a workload that contains one or more queries, materialized views have not yet been generated and the system must generate appropriate materialized views. Thus, a materialized view does not yet exist that can be used to assign instance numbers in the query.

Assigning instance numbers randomly could cause the creation of unnecessary materialized views. For example, two equivalent queries could have different SQL statements due to different ordering of tables in a FROM clause, different joins in a WHERE clause, or other syntactical differences. If the instance numbers for two equivalent queries are assigned differently, each query would get a different materialized view recommendation even though they could have shared the same materialized view.

A number of commercial tools are available for tuning queries including Oracle's SQL Access Advisor. In the past, queries containing multiple instances of the same table were only considered for MV recommendations that exactly matched the text of the query. This has a disadvantage that if the query is complex, the materialized view will not be incrementally refreshable and further multiple queries will not be able to benefit from the same materialized view.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Systems, methods, computer-readable media and other embodiments are provided that relate to processing database queries. In one embodiment, a query analysis logic can be configured to analyze a query to identify multiple instances of the same table. Instance numbering for the multiple table instances can then be performed using the query structure itself (e.g. properties of join operations) such that equivalent queries will likely get the same instance number assignments. This improves the likelihood that the same materialized view will be recommended to two or more equivalent queries even though the exact text of each query may not match each other. Thus, the order in which the table instances occur in a query and/or other minor differences in the query may be ignored when assigning instance numbers to tables.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a storage medium that participates in directly or indirectly storing instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, stored software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software stored in a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Query", as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores and/or information sources.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, analyzing, generating, displaying, or the like, refer to actions and processes of a computer system, logic, processor, or similar electronic device that manipulates and transforms data represented as physical (electronic) quantities.

Figure 1:
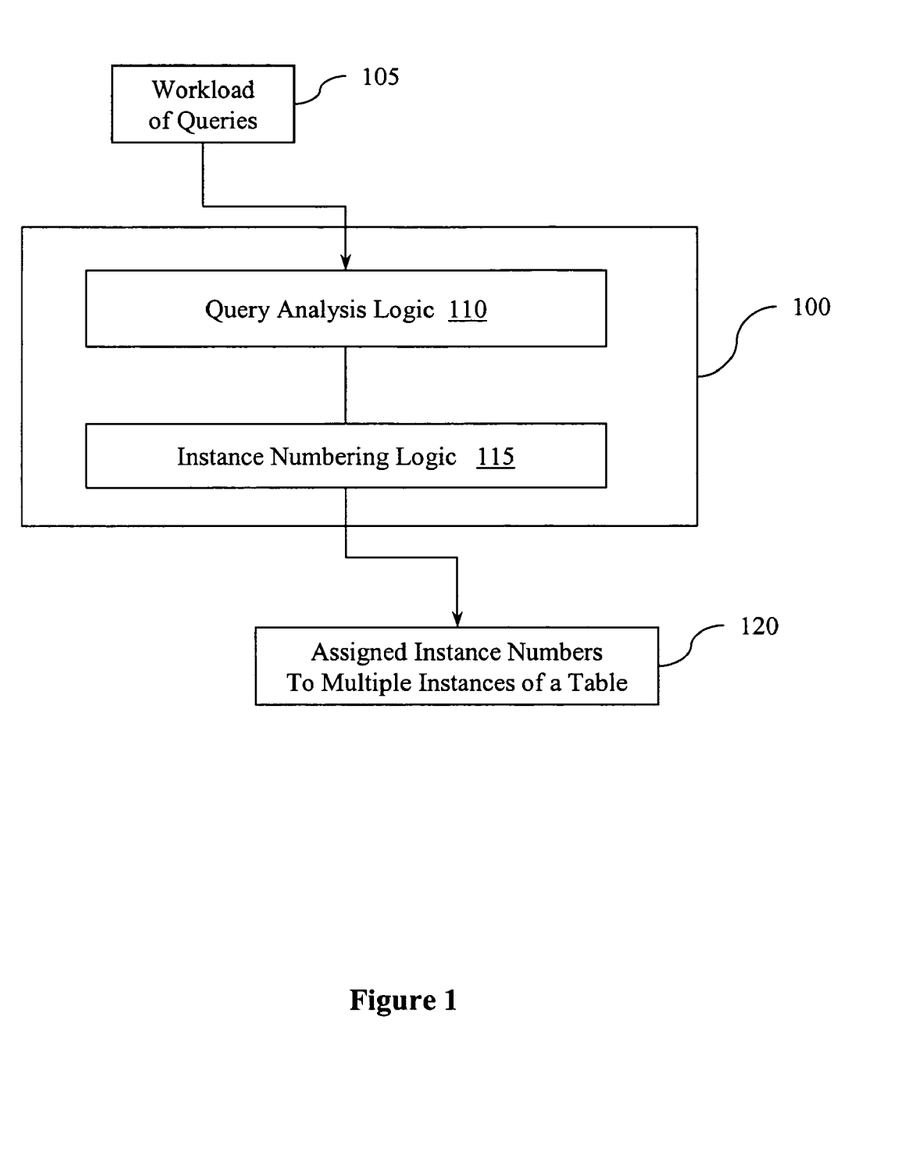
FIG. 1 illustrates an example embodiment of a query processing system.

Illustrated in FIG. 1 is one embodiment of a system 100 that is configured with logic that can process database queries from a workload of queries 105. For example, the system 100 can include a query analysis logic 110 that can be configured to analyze a database query from the workload 105 and identify multiple instances of a table. An instance of a table is one or more uses of a label within the query that refers to the table. An instance, for example, can include the table name and any alias labels assigned to the table name.

Additionally, the query analysis logic 110 can be configured to identify table instances that are part of join operations. In SQL, a FROM clause contains tables, a WHERE clause defines one or more join operations, and a GROUP BY clause has keys. Of course, in other programming languages, the join operations can be identified based on its corresponding syntax.

If the query 105 includes multiple instances of the same table, an instance numbering logic 115 can be configured to assign an instance number to each of the multiple instances of the table in the query 105. The instance numbering logic 115 can output assigned instance numbers 120. The instance numbers can be generated based on a structure of the join operation in which the table appears such that equivalent join operations from different queries (e.g. queries that may not match syntactically) will be assigned the same instance numbers. By having the same instance number assignments, two different queries that have equivalent join operations will get a common materialized view recommended rather than creating two separate materialized views. Two join operations are equivalent, for example, if they both produce the same join graph.

For example, suppose query 1 includes three instances of a table named "table1" and has the following three join predicates: join 1 has a predicate as (table1.$a$=table2.$b$), join 2 has a predicate as (table1.$d$=table3.$a$) and join 3 has a predicate as (table2.$c$=table1.$c$). As a further example, suppose query 2 includes three instances of the same table1 as follows: join 1 has a predicate of (table3.$a$=table1.$b$), join 2 has a predicate (table1.$c$=table2.$c$), and join 3 has a predicate (table2.$b$=table1.$a$).

As can be seen from the join predicates, query 1 and query 2 will have equivalent join graphs even though the join predicates are in different orders and have a different arrangement of parameters. e.g. Query 1 (join 1) is equivalent to query 2 (join 3), query 1 (join 2) is equivalent to query 2 (join 1), and query 1 (join 3) is equivalent to query 2 (join 2). If the system can identify this equivalence, both query 1 and query 2 should be given the same materialized view recommendation.

The instance numbering logic 115 is configured to assign the same instance number to equivalent join operations between different queries when multiple instances of the same table occur in both queries. The instance numbering is based on the structure of each join operation (e.g. properties or parameters taken from the join predicate) rather than being based on the syntax of the join predicate or the order in which the table instances occur in the query. Thus, even though two queries do not match exactly in terms of its text, the equivalent join operations can be identified and will be assigned the same instance numbers. In one embodiment, the identification can be performed by generating signatures for each join operations, which will be described below.

Accordingly, once a materialized view is recommended for the first query (query 1), the probability that the second query (query 2) is recommended to the same materialized view is improved. This is because the instance numbering between query 2 and query 1 (and thus with the materialized view definition) will match due to the instance numbers generated by the instance numbering logic 115. This should be true even though the text of query 2 does not match exactly with the text of query 1 or with the materialized view definition.

Figure 2:
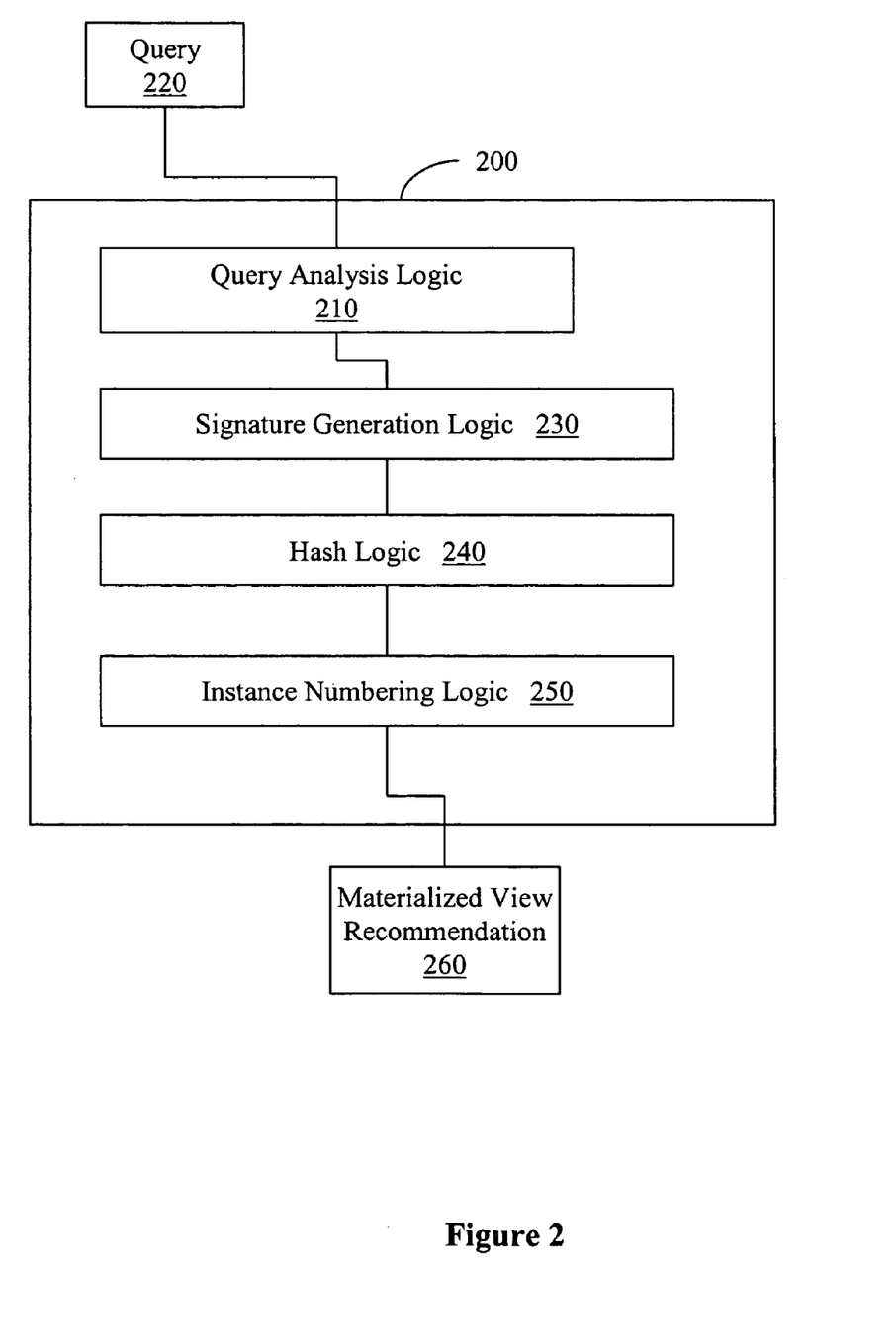
FIG. 2 illustrates another example embodiment of a query processing system.

Illustrated in FIG. 2 is another embodiment of a query processing system 200 that is configured to recommend a materialized view for queries with multiple instances of the same table. The system 200 can include a query analysis logic 210 that is configured to analyze one or more database queries 220 and identify multiple instances of a table in a query. As previously described, an instance of a table can include the table being part of a joint operation (e.g. as part of a join predicate). Characteristics of each identified instance of the table within the query and its corresponding join operation are inputted to a signature generating logic 230.

The signature generating logic 230 is configured to generate a signature for each join operation based on parameters of the join operation. The signature can then be associated to the instance of the table. Parameters of the join operation can be taken from the join predicate and/or surrounding information in the query. For example, parameters can be selected from an object number assigned to the table instance, object numbers assigned to other tables that are joined to the table instance, column identifiers of one or more columns listed in the join operation, column numbers of one or more columns that appear in the join predicate, or other selected information that surrounds the join predicate.

In one embodiment, the parameters are selected that have numeric values. The numeric values can then be combined using a selected function to generate a signature of the join operation based on those parameter values. One example function can include a XOR function that combines the values together to generate a signature value.

Each signature value can then be inputted into a hash logic 240 that is configured to generate a hash value from each signature value. A hash function can be selected to generate a unique value for each signature value. An instance numbering logic 250 can be provided that can be configured to order the hash values and assign instance numbers to each instance of the table based on the order of the hash values. The instance numbers can then be used, at least in part, determine a materialized view recommendation for the database query.

In one embodiment, the hash values are ordered in an ascending order and the instance numbers can be assigned sequentially (e.g. 1, 2, 3, ...) based on the ascending order. Of course, other types of numbering schemes can be used like a descending order or other desired scheme. Once the table instances have been numbered, a materialized view recommendation 260 can be made using the instance numbers and other information from the query as desired to match with an appropriate materialized view. As previously mentioned, one benefit is that equivalent queries will be assigned the same instance numbers to improve the likelihood that the equivalent queries receive the same MV recommendation.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 3:
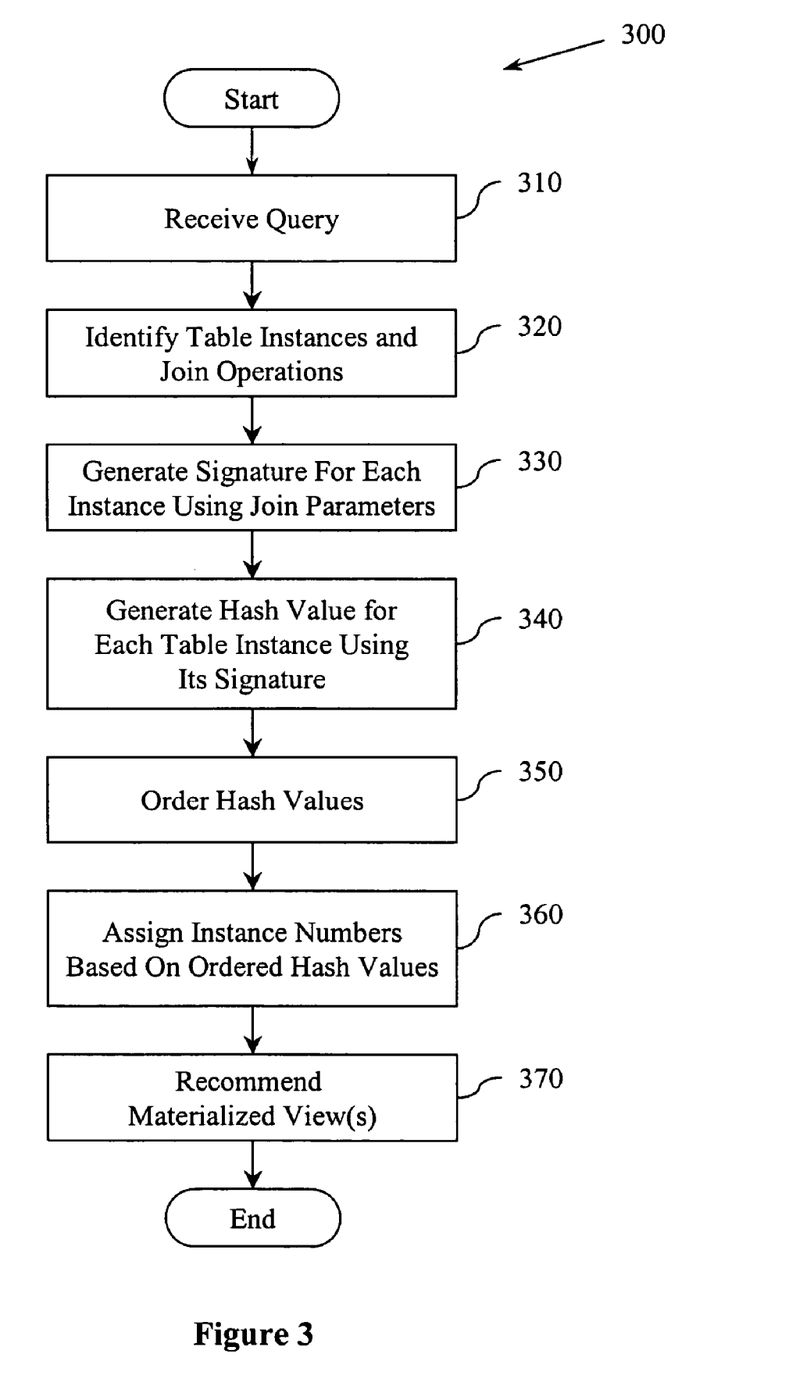
FIG. 3 illustrates an example embodiment of a methodology associated with query analysis.

Illustrated in FIG. 3 is an example methodology 300 that can be associated with analyzing queries and assigning instance numbers to table instances. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 3, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing.

With reference to FIG. 3, the methodology 300 can initiate when one or more queries are received (block 310). The queries can be part of a workload as described previously. For a selected query, table instances are identified as well as each join operation that contains an instance of the table (block 320). If the query includes multiple instances of a table, a signature can be generated for each instance using parameters from an associated join operation (block 330). The signature can represent the resultant characteristics (e.g. a join graph) of the join operation without being dependent on query syntax that does not impact the join graph.

Selected parameters that can be used include, for example, one or more of the following: an object number assigned to the table instance, object numbers assigned to other tables that are joined to the table instance, column identifiers of one or more columns listed in the join operation, column numbers of one or more columns that appear in the join predicate, or other selected information that surrounds the join predicate. Using information that surrounds the join predicate can assist to generate a unique signature that represents the join operation and, thus, can represent a join graph that is produced by the join operation.

In one embodiment, the parameters are selected as numeric values that are combined using a function like an XOR function. For example, suppose the parameter values selected from a join operation included values like 4, 35, 122, 17, 8, and 7. The values can be converted to a desired format like binary form. A signature value can be generated by XOR'ing these values together. Of course, other functions can be used to generate a signature.

Once the signatures are generated, the methodology 300 can further use each signature to generate a hash value for the corresponding table instance (block 340). For example, a signature is inputted into a selected hash function and a unique hash value is generated for the table instance. In this manner, two queries that have equivalent join operations (e.g. they have equivalent join graphs) but do not match exactly in their text, would produce the same hash value using the methodology 300.

With further reference to FIG. 3, after the hash values are generated for the multiple table instances, the hash values can be ordered (block 350) and instance numbers can be assigned based on the ordered hash values (block 360). In one embodiment, the hash values can be ordered in an ascending order and then the instance numbers can be assigned to the table instances. Of course, other orders can be used. A materialized view can then be recommended for the query using the assigned instance numbers and/or other desired criteria.

It will be appreciated that in another embodiment, generating a hash value can be omitted. For example, the signature values generated in block 330 can be ordered and used to assigned the instance numbers. The type of function used to generate the signature values would determine how well suited it would be for assigning instance numbers.

In another example embodiment, a methodology can be provided as follows and/or computer executable instructions can be configured to cause a computer to perform the following methodology. For a query that contains multiple instances of a table, initialize instance numbers of all tables to zero (0) or another desired starting point. For each table referenced multiple times in the query: compute a hash value by taking into account join predicates from that table to other tables in the query. The computation of the hash function is configured so that the same joins expressed using a different order or other minor differences, will produce the same hash values. For example, join predicate (t1.$a$=t2.$b$) and join predicate (t2.$b$=t1.$a$) will result in the same hash value being generated since they are equivalent.

Then, assign instance numbers to the table instances in order of the hash values (e.g. ascending order, descending order, or other order). If two queries have identical join graphs, the methodology will produce the same instance numbering regardless of how the tables and their joins appear in the query text. Hence, the two queries will ultimately receive a common materialized view recommendation thereby eliminating the need to create an extra materialized view that would consume additional storage space and other resources.

Figure 4:
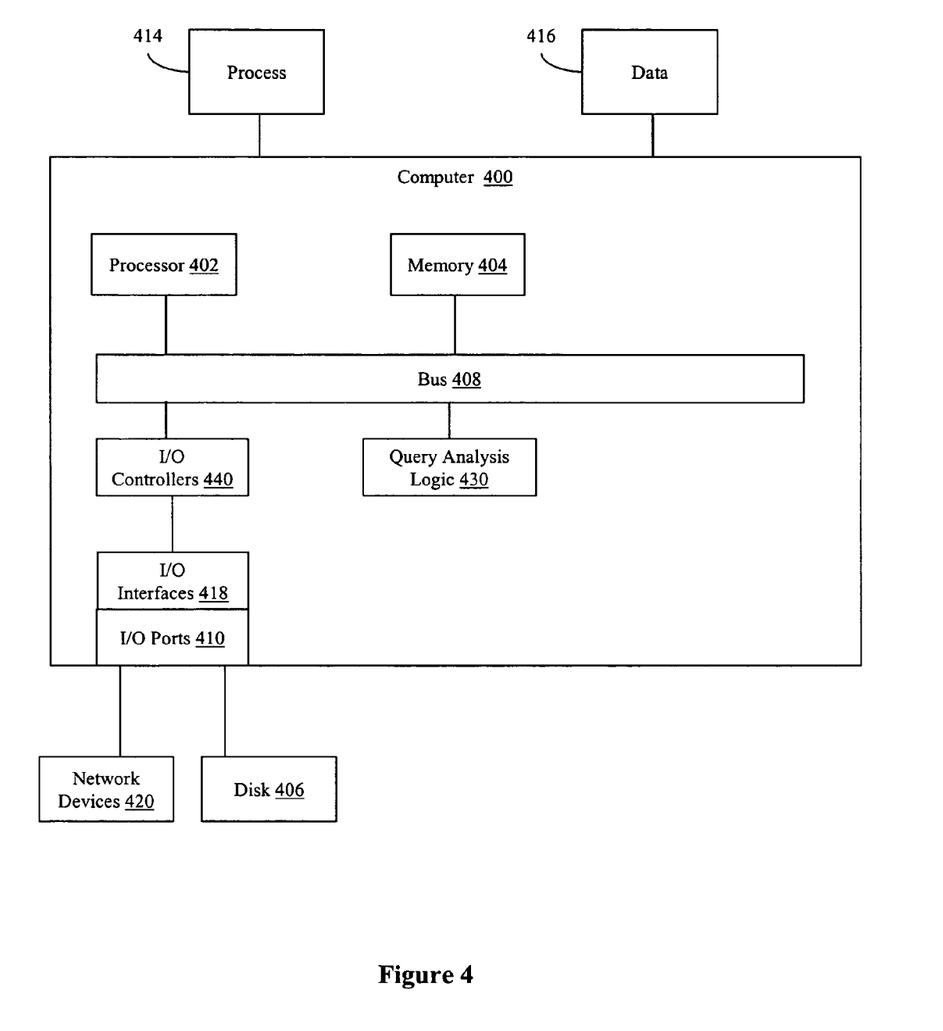
FIG. 4 illustrates an example computing environment in which example systems and methods illustrated herein can operate.

FIG. 4 illustrates an example computing device in which example systems and methods described herein, and equivalents, can operate. The example computing device may be a computer 400 that includes a processor 402, a memory 404, and input/output ports 410 operably connected by a bus 408. In one example, the computer 400 may include a query analysis logic 430 configured to facilitate analysis of a query, assignment of instance numbers for multiple instances of a table, and recommending a materialized view. The query analysis logic 430 can be implemented similar to the system 100 and/or 200 described in FIGS. 1 and 2, respectively, and/or the other systems and methods described herein.

Generally describing an example configuration of the computer 400, the processor 402 can be a variety of various processors including dual microprocessor and other multi-processor architectures. The memory 404 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 406 may be operably connected to the computer 400 via, for example, an input/output interface (e.g., card, device) 418 and an input/output port 410. The disk 406 can include, but is not limited to, devices like a magnetic disk drive, a solid state disk drive, a floppy disk drive, a tape drive, a Zip drive, a flash memory card, and/or a memory stick. Furthermore, the disk 406 can include optical drives like a CD-ROM, a CD recordable drive (CD-R drive), a CD rewriteable drive (CD-RW drive), and/or a digital video ROM drive (DVD ROM). The memory 404 can store processes 414 and/or data 416, for example. The disk 406 and/or memory 404 can store an operating system that controls and allocates resources of the computer 400.

The bus 408 can be a single internal bus interconnect architecture and/or other bus or mesh architectures. While a single bus is illustrated, it is to be appreciated that computer 400 may communicate with various devices, logics, and peripherals using other busses that are not illustrated (e.g., PCIE, SATA, Infiniband, 1394, USB, Ethernet). The bus 408 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 400 may interact with input/output devices via i/o interfaces 418 and input/output ports 410. Input/output devices can include, but are not limited to, a keyboard, a microphone, a pointing and selection device, cameras, video cards, displays, disk 406, network devices 420, and the like. The input/output ports 410 can include but are not limited to, serial ports, parallel ports, and USB ports.

The computer 400 can operate in a network environment and thus may be connected to network devices 420 via the i/o devices 418, and/or the i/o ports 410. Through the network devices 420, the computer 400 may interact with a network. Through the network, the computer 400 may be logically connected to remote computers. The networks with which the computer 400 may interact include, but are not limited to, a local area network (LAN), a wide area network (WAN), and other networks. The network devices 420 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 420 can connect to WAN technologies including, but not limited to, point to point links, circuit switching networks like integrated services digital networks (ISDN), packet switching networks, and digital subscriber lines (DSL).

In another embodiment, an application programming interface (API) can be configured to provide access to a system for processing and analyzing queries as described above. The API can be employed, for example, by a programmer and/or a process to gain access to processing performed by the system. For example, a programmer can write a program to access the query analysis system (e.g., invoke its operation, monitor its operation, control its operation) where writing the program is facilitated by the presence of the API. Rather than programmer having to understand the internals of the system, the programmer merely has to learn the interface to the system. This facilitates encapsulating the functionality of the system while exposing that functionality.

Similarly, the API can be employed to provide data values (e.g. a workload, queries) to the system and/or retrieve data values from the system (e.g. an MV recommendation). Thus, in one example of the API, a set of application programming interfaces can be stored on a computer-readable medium. The interfaces can be employed by a programmer, computer component, logic, and so on to gain access to a system for analyzing queries and recommending an materialized view for a query.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer system, comprising:
   a query analysis logic, embodied on a non-transitory computer-readable medium, configured to analyze a database query and identify multiple instances of a table where an instance of a table within the query includes the table being part of a join operation; and
   an instance numbering logic, embodied on a non-transitory computer-readable medium, configured to assign an instance number to each of the multiple instances of the table in the query based on a structure of the join operation such that equivalent join operations from different queries that do not match syntactically will be assigned the same instance numbers such that a common materialized view is recommended for both of the different queries.

2. A non-transitory computer-readable medium storing processor executable instructions that when executed by a computer cause the computer to perform a method, the method comprising:
   analyzing a database query and identifying multiple instances of a table where an instance of a table within a query includes the table being part of a join operation;
   generating a signature for each join operation based on parameters of the join operation and associating the signature to the instance of the table;
   generating a hash value from each signature; and
   ordering the hash values and assigning instance numbers to each instance of the table based at least in part on the order of the hash values, where the instance numbers are used to recommend a materialized view for the database query.

3. The system of claim 1, where the signature generating logic is configured to combine the parameters of the join operation using an XOR function to generate the signature.

4. The system of claim 1 where the signature generating logic and the hash logic are configured to generate the same hash value for equivalent queries where the equivalent queries do not have matching text.

5. A computer implemented method, comprising:
   receiving a database query by a computing device;
   parsing the database query, using at least a processor of the computing device, to identify multiple instances of a table and associated join operations, where a join operation includes a table instance within the query and parameters that define the join operation;
   for each instance of the table associated with a join operation, generating a signature value for the join operation using values associated to selected parameters from the join operation where the signature value reflects a join graph produced by the join operation;
   assigning an instance number to each of the multiple instances of the table based at least in part on the signature value associated to each of the instances, where the instance number is stored in a memory of the computing device; and recommending a materialized view for the database query using the instance numbers assigned to the database query.

6. The method of claim 5, where the signature value is generated by combining the values associated to the selected parameters using an XOR function.

7. The method of claim 5, where the parameters that define the join operation include at least one of: an object number assigned to the table instance, object numbers assigned to other tables that are joined to the table instance, column identifiers of one or more columns listed in the join operation, and column numbers of the one or more columns.

8. The method of claim 5 where generating the signature value includes generating a hash value from the signature value using a hash function where the hash value becomes the signature value.

9. The method of claim 5 further including receiving a plurality of database queries that are part of a workload; and for each database query having multiple instances of the table, assigning the same instance numbers to equivalent joint operations that include the instance of the table within the query such that the same materialized view is recommended to two or more of the database queries that do not match syntactically but have equivalent join operations.

10. A non-transitory computer-readable medium storing processor executable instructions that when executed by a computer cause the computer to perform a method, the method comprising:

analyzing a query to determine if the query contains multiple instances of a table; and assigning instance numbers to the multiple instances of the table based at least in part on signatures of join operations that contain an instance of the table within the query, where a signature is based at least in part on selected parameters from the join operation and where the same signature is generated for equivalent join operations to cause a common materialized view to be recommended.

11. A system, comprising:

at least one processor and a memory;

means for analyzing a query, using the at least one processor, to determine if the query contains multiple instances of a table; and means for assigning instance numbers to the multiple instances of the table based at least in part on signatures of join operations that contain an instance of the table within the query, where a signature is based at least in part on selected parameters from the join operation and where the same signature is generated for equivalent join operations to cause a common materialized view to be recommended.

* * * * *